No. 859,510. PATENTED JULY 9, 1907.
B. McINNERNEY.
ELECTRIC IGNITER FOR GAS ENGINES.
APPLICATION FILED NOV. 21, 1899.
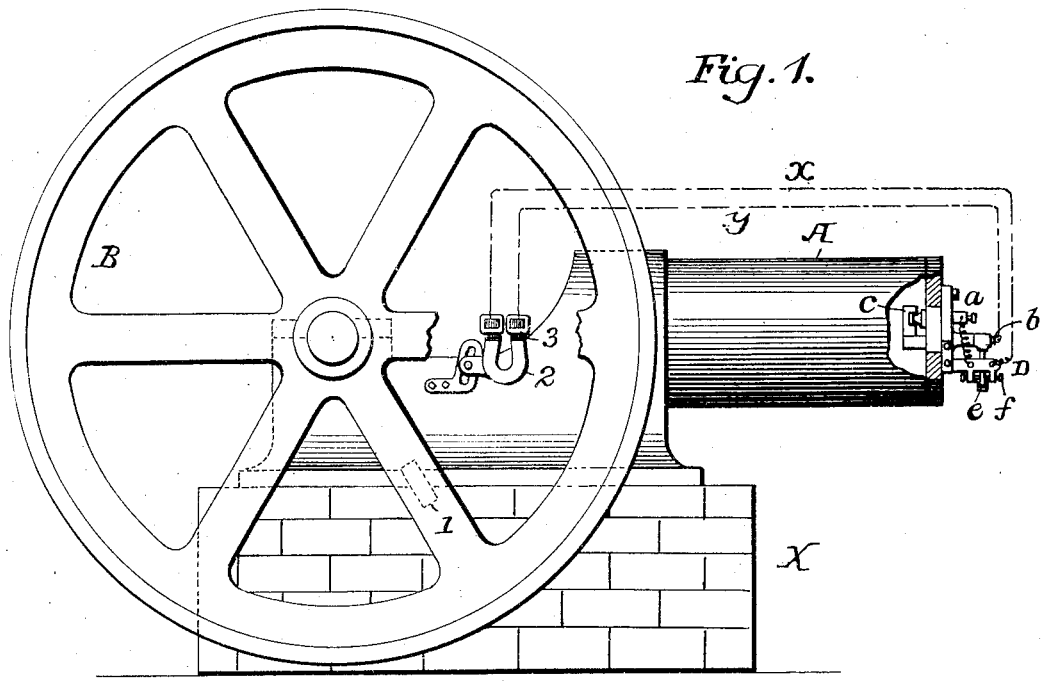
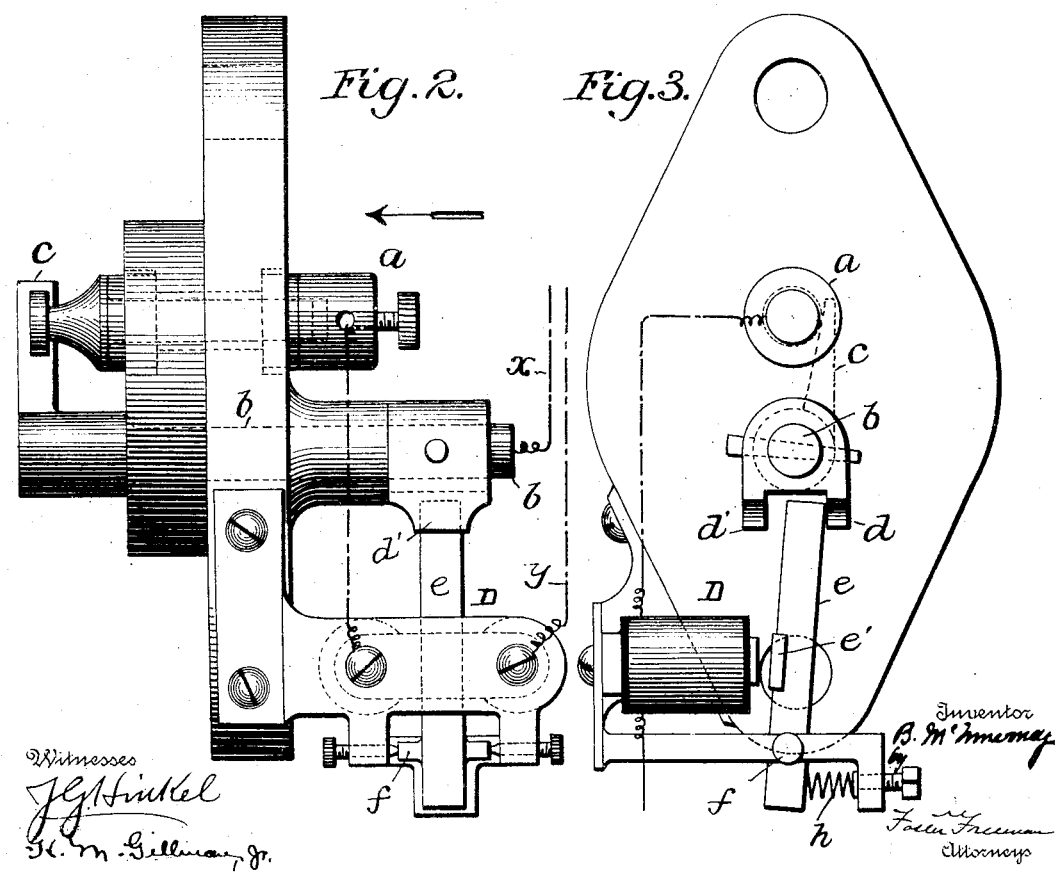

UNITED STATES PATENT OFFICE.

BENJAMIN McINNERNEY, OF OMAHA, NEBRASKA, ASSIGNOR TO LOUIS DOHME, OF BALTIMORE, MARYLAND.

ELECTRIC IGNITER FOR GAS-ENGINES.

No. 859,510.  Specification of Letters Patent.  Patented July 9, 1907.

Application filed November 21, 1899. Serial No. 737,807.

*To all whom it may concern:*

Be it known that I, BENJAMIN MCINNERNEY, a citizen of the United States, residing at Omaha, in the county of Douglas and State of Nebraska, have invented certain new and useful Improvements in Electrical Igniters for Gas-Engines, of which the following is a specification.

In that class of internal combustion engines where an electric spark is the medium of igniting the charge and where a generator furnishes an electrical impulse or succession of impulses to the igniter, difficulties have been experienced from the fact that the electrodes of the electric igniter are sometimes separated before or after the electrical impulse is at its point of highest efficiency, resulting from the wear of the gears or cams or connections or the slipping of adjusting screws etc., so that in many instances the igniting spark is not produced at the time when the electrical current is at its highest efficiency. To overcome this defect I dispense with the use of mechanical appliances for separating the electrodes (which may be one or both movable) and instead I make use of the current produced at the generator to operate a motor which actuates the electrodes, so that the latter are separated at the moment when the motor is moved by the generated current, and which, of course, is at the moment when the said current is in its most effective condition.

In the drawings I have illustrated one construction of apparatus which may be employed in carrying out my invention.

In said drawings: Figure 1 is an elevation, in part section, of sufficient of a gas engine to illustrate my invention. Fig. 2 is an enlarged side view showing the cylinder head, electrical igniter and electric motor for operating the same; and Fig. 3 is a face view of the parts shown in Fig. 2, looking in the direction of the arrow.

The engine mounted upon a suitable foundation, X, is provided with a frame having bearings for the crank-shaft upon which is mounted the fly-wheel, B; and the cylinder, A, also supported by the frame, is provided with any suitable electrical igniter, that shown consisting of a fixed electrode, a, and a movable electrode, c, the latter being an arm upon a rock-shaft b.

The engine is provided with a generator which, as shown, consists of a horse-shoe magnet, 2, carried by the frame of the engine, and an armature, 1, carried by the fly-wheel, B, and around the poles of the magnet are wound coils, 3, in electrical circuit with the igniter through the medium of wires, x, y.

The igniter instead of being operated mechanically to break the circuit is operated electrically through the medium of the current created in the coils by the passage of the armature across the magnet of the generator. This may be done in any suitable manner, through the medium of any suitable electric motor. As shown there is a motor, D, consisting of two electro-magnets, the coils of which are in circuit with the circuit including the igniting circuit-breaker and the generator. Opposite the electric motor, D, is a lever, e, pivoted at f and carrying the armature e', of the electric motor, and the end of the lever extends between the prongs d, d', of a forked arm on the end of the shaft, b, of the movable electrode.

A spring, h, which may be adjustable to any desired tension, throws the lever, e, into contact with the prong, d, and thereby rocks the shaft, b, to maintain the electrodes in contact.

When a current is generated in the generator by the passage of the armature, 1, over the magnet 2, it passes through the igniter, the electrodes of which are in contact, and also through the coils of the electric motor, D, and by exciting the magnets of the latter causes the armature e', to be drawn to the magnets, bringing the lever, e, forcibly against the prong, d' of the fork, rocking the shaft, b, and carrying the electrode, c, away from the electrode, a, breaking the circuit and causing a spark which explodes the charge. It will be seen that these operations, which are practically simultaneous, and the spring h is compressed so that the operations will take place as the current in the electric circuit reaches its maximum intensity, and that it is not possible for the electrodes to be separated before or after the electric current has thus been generated, as is the case frequently when mechanical means for separating the electrodes are employed.

While I have shown one form of electro-magnet and generator and means of imparting movement to a movable electrode, it will be evident that these parts may be varied very materially without departing from the main features of my invention.

From the foregoing description, it must be obvious that the generator herein disclosed is arranged to create, intermittently, a difference of electric potential which becomes available to supply current for the spark. Any electric generator capable of said functions may be employed, for coöperation with a magnetic or motor controlled sparking plug, to embody and realize the invention herein disclosed and claimed. Otherwise stated, I do not limit myself to the particular electric generator herein shown and described, but contemplate the use of any generator capable of the functions above noted.

With an electric generator thus capable of creating, intermittently, a difference of electric potential which becomes available to supply the desired current for use with a magnetic or electrically controlled sparking plug, there is no necessity for any mechanism, such as a commutator or switch, to open and close the igniter circuit at any other point than at the electrodes. This is a radical distinction over any combination including a magnetic plug or electrically controlled sparking device, and a generator which creates continuously a difference of electric potential available to supply the current when the circuit is closed. For example, said above noted distinction differentiates the invention herein disclosed and claimed from the electric igniter disclosed in U. S. Patent 634,430, issued to Walter H. Colton, of date October 3d, 1899. Cotton employs a magnetic or electrically controlled sparking plug in combination with a battery, and a circuit maker and breaker for timing the period or interval of the battery's activity. For further example, said above noted distinction differentiates the invention herein disclosed and claimed from any igniter combination including a magnetic plug and an ordinary dynamo or magneto, arranged to create continuously a difference of electric potential available to supply the current whenever the circuit is closed; for the reason that all such organizations require a timing device, such as a commutator or switch, to close the igniter circuit at some additional point, besides at the electrodes, during the interval of time throughout which the current is supplied. Moreover, it should be noted that with an electric generator arranged to create, intermittently, a difference of electric potential which becomes available to supply current for the spark, the current is delivered in a single impulse which is essential to the practical success of a magnetic sparking plug. It is not practicable to use a magnetic plug in an igniter circuit which includes a sparking or kickback coil; for the reason that the circuit would open at the magnetic plug before the coil can discharge. Such sparking or kick-back coils are very generally employed, and are universally employed, when batteries are used as the generator, for the reason that it is commercially impracticable to employ enough cells to raise the E. M. F. high enough to dispense with the sparking or kick-back coil.

Attention is called to the fact that the electric motor herein shown and described is arranged to operate with a hammerlike blow for separating the electrodes to produce the spark. This is a feature of considerable importance. The electrodes should, for the best results, be quickly separated, and this must be done when the explosive mixture is under compression, requiring considerable force, therefore, for the purpose. By utilizing a hammerlike blow, the quick separation is insured and the required amount of force is rendered available from a motor of less power than would otherwise be required. The motor herein disclosed is in the form of an electro magnet or magnets, having a spring-held armature lever for imparting the separating blow to the electrodes. Hence the armature lever will start to move at a lower voltage than if directly connected to one of the electrodes, and the nearer said armature lever approaches the core or cores of the magnets, the greater the attraction, of course, under the well known law as to the square of the distances, and hence the blow is imparted at the instant when the armature lever is under the influence of the maximum attractive force. Practice has demonstrated this to be a highly efficient form of electrical circuit breaker in igniters for explosive engines.

As shown, the armature lever of the motor also throws the movable electrode into circuit closing position with a hammerlike blow, under the action of the lever's retracting spring; but that function is not of equally great importance. The place where the hammerlike blow is especially needed is at the separation of the electrodes.

Without limiting myself to the precise construction and arrangement of parts, I claim as my invention:

1. An electric igniter for explosive engines, comprising an electric generator arranged to create, intermittently, a difference of electric potential available to supply current for the spark, an igniter circuit supplied from said generator and having separable electrodes in the explosion chamber of the engine, and an electric motor actuated by current supplied from said generator and operating to separate said electrodes to produce the spark.

2. An electric igniter for explosive engine, comprising an electric generator arranged to generate, intermittently, current for the spark, an igniter circuit supplied from said generator and provided with electrodes in the explosion chamber of the engine, one movable and the other stationary, said electrodes being insulated from each other, and an electric motor also in said igniter circuit and controlling the movable member of said electrodes, to make and break said circuit, substantially as described.

3. In an explosive engine, the combination with an electric generator arranged to generate, intermittently, current for the spark, an igniter circuit supplied from said generator and provided with electrodes in the explosion chamber, insulated from each other, one of which is movable and is carried by an armature lever, and an electromagnet also in said igniter circuit and operative on said armature lever, whereby the circuit will be broken approximately at the instant of maximum generation, substantially as described.

4. In an explosive engine, the combination with a magneto generator arranged to generate, intermittently, current for the spark of an igniter circuit supplied from said magneto generator and provided with electrodes in the explosion chamber insulated from each other, one of which electrodes is movable, and an electric motor also in said circuit having an armature connected to operate said movable electrode, to make and break the igniter circuit, substantially as described.

5. An electric igniter for explosive engines, comprising an electric generator arranged to generate current intermittently, an igniter circuit supplied from said generator and provided with electrodes in the explosion chamber of the engine, insulated from each other, one of which electrodes is movable, and an electric motor also in said igniter circuit and controlling the movable electrode, to make and break said circuit, substantially as described.

6. The combination with a gas engine, of a magneto generator arranged thereon to generate currents intermittently, a circuit including said magneto-generator, electrodes carried by the cylinder, one movable and the other stationary and insulated, and an electric motor also in said circuit and having an armature connected to operate the movable electrode to make and break the circuit, substantially as set forth.

7. The combination with a gas engine, of a circuit including a magneto-generator and made and broken only within the ignition chamber, separable electrodes in said circuit, an electric motor also in said circuit and having an armature connected to operate the movable electrode to make and break the circuit, and means for preventing the movement of the armature until the actuating current reaches its maximum intensity, substantially as set forth.

8. In an igniter for explosive engines, the combination with an intermittently acting electric generator and means for operating the same periodically, of a sparking plug having electrodes electrically connected to said generator and normally in contact with one another, one of said electrodes being movable, and an electro-magnetic device electrically connected to said generator and adapted to separate the electrodes.

9. An electric igniter for explosive engines, comprising an intermittently acting electric generator, separable electrodes in the explosion chamber of the engine, and an electric motor supplied with current from said generator and arranged to impart a hammerlike blow to separate said electrodes to produce the spark.

In testimony whereof I have signed my name to this specification in the presence of two subscribing witnesses.

BENJAMIN McINNERNEY

Witnesses:
J. B. GARNSEY.
H. J. PODLESAK.